Dec. 6, 1938.  A. E. SCHNELL ET AL  2,139,287
MACHINING OF CAST PISTONS
Filed Aug. 25, 1936  3 Sheets-Sheet 1
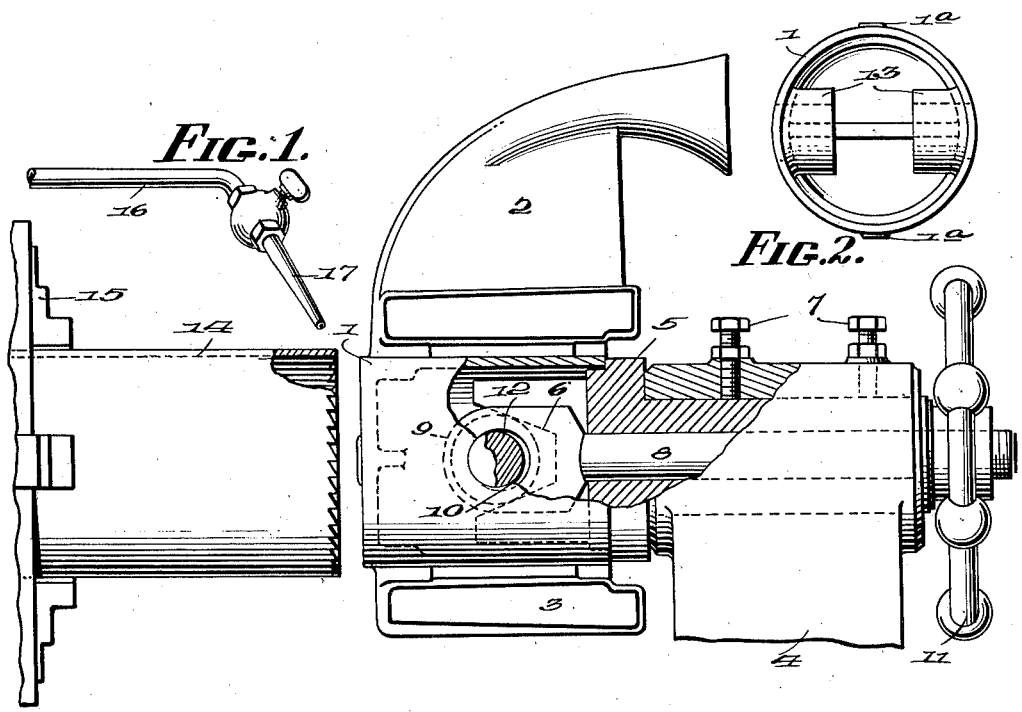
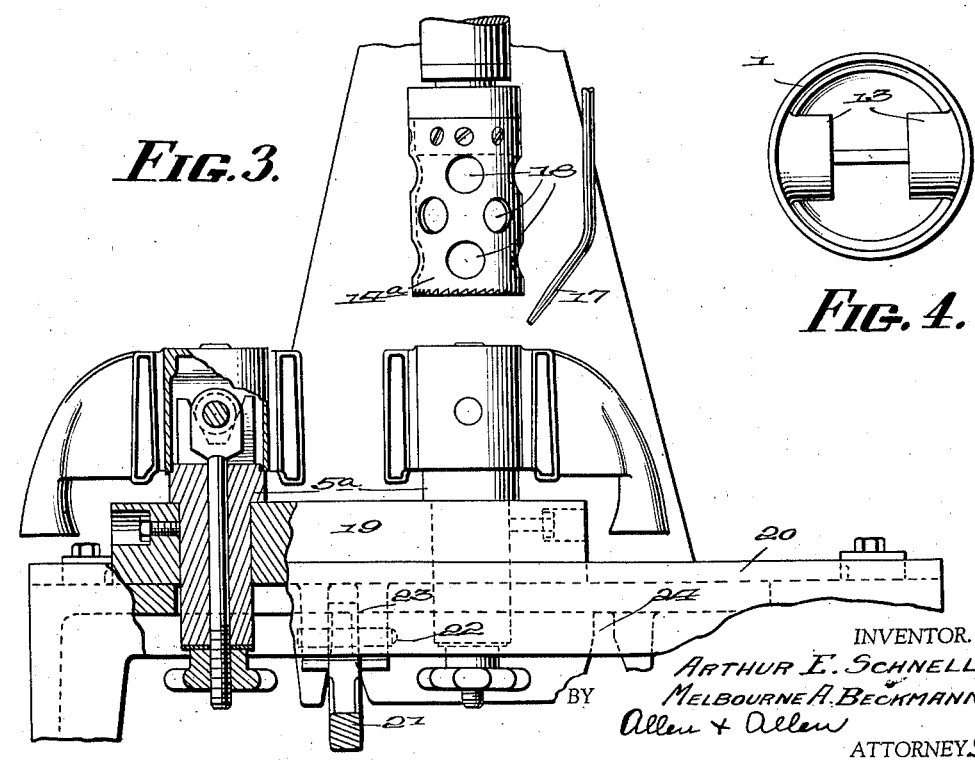
INVENTOR.
ARTHUR E. SCHNELL,
MELBOURNE A. BECKMANN,
BY Allen + Allen
ATTORNEYS

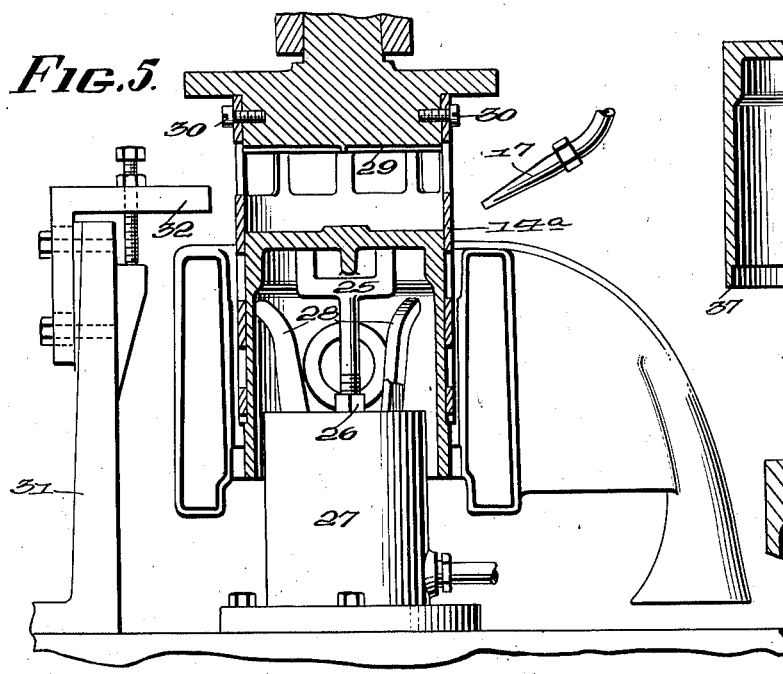

INVENTOR.
ARTHUR E. SCHNELL,
MELBOURNE A. BECKMANN,
BY Allen + Allen
ATTORNEYS.

Patented Dec. 6, 1938

2,139,287

UNITED STATES PATENT OFFICE 2,139,287

MACHINING OF CAST PISTONS

Arthur E. Schnell and Melbourne A. Beckmann, Cincinnati, Ohio, assignors to Aluminum Industries Inc., Cincinnati, Ohio, a corporation of Ohio Application August 25, 1936, Serial No. 97,842

6 Claims. (Cl. 82—1)

Our invention relates to the machining of cast pistons. As these pistons are cast they are provided with a gate and a riser, which are necessary during the casting operation as is well known in the art, but which must be removed prior to further machining operations.

It has been the practice in the past to remove these appendages by means of a band saw, but this procedure is objectionable because it leaves lands, which must be filed smooth before the casting may be put in a lathe for turning purposes.

It is therefore an object of our invention to provide means for removing gates and risers from cast pistons which will place the pistons in condition for further machining operations with little or no manual labor.

Another object of our invention is to provide such means which are more rapid than any which have been used in the past. Other objects of our invention include in various degrees, the provision of means for rough machining such cast pistons, including a machining of the piston walls, a surfacing of the head end and the machining of a flange on the piston skirt.

Further objects of our invention include the provision of novel tools for the purposes mentioned above, and the provision of holding and centering devices for the pistons to be machined.

These and other objects of our invention which will be apparent to one skilled in the art upon reading these specifications, or which will be pointed out hereinafter, we accomplish by that construction and arrangement of parts of which we shall now describe several preferred embodiments.

Reference is now made to the drawings which form a part hereof, and in which:

Fig. 1 is an elevation with parts in section showing a set up in connection with a lathe.

Fig. 2 is an end view of a cast piston after it has been machined in the set up of Fig. 1.

Fig. 3 shows a similar set up for a drill press or a vertical milling machine, together with a slidable jig and indexing means.

Fig. 4 is an end elevation of a piston which has been machined on the set up of Fig. 3.

Fig. 5 shows a modified set up in which the piston wall and the head end of the piston are machined.

Fig. 6 is a partial cross section of a piston machined on the set up of Fig. 5.

Fig. 7 shows an arrangement for machining the piston wall and facing the piston skirt and counter-boring the piston skirt.

Fig. 8 is a cross sectional view of a piston machined on the set up of Fig. 7.

Figure 9:
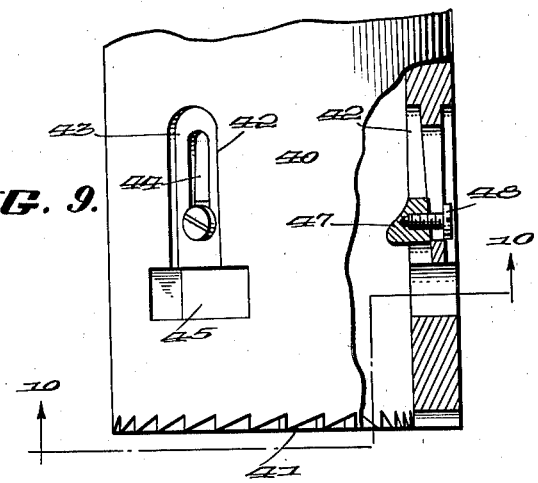
Fig. 9 is a side elevation with parts in section of a novel tool which is useful in practicing my invention.
Figure 11:
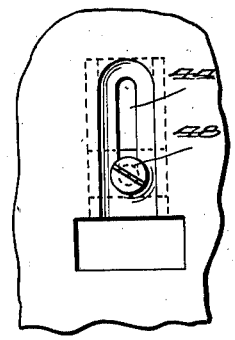
Fig. 11 is a detailed view of one of the tool holding slots, used in the device shown in Fig. 9.
Figure 10:
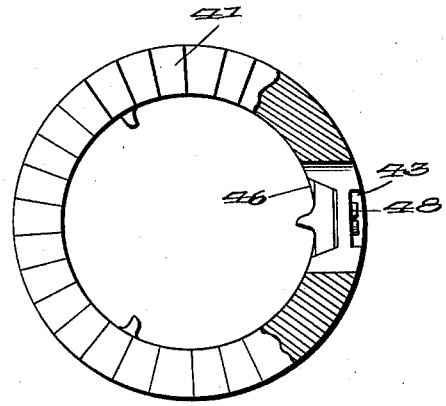
Fig. 10 is a view taken on the line 10—10 of Fig. 9.
Figure 12:
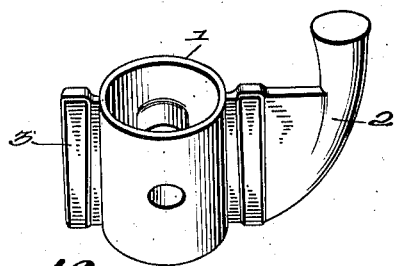
Fig. 12 is a perspective view of a cast piston as it comes from the foundry showing the gate and riser.

Briefly, in the practice of our invention, instead of removing the gate and riser from a cast piston by means of a band saw, we contemplate the use of a barrel saw. In Fig. 1 we have shown our fundamental set up in which the cast piston is indicated at 1, having the gate 2 and riser 3, which are to be removed. We support this piston in a conventional manner in a device which is mounted in the tool holder 4 of the lathe. This device comprises a block 5, provided with a V-shaped slot 6, said device being gripped in the tool holder 4 by means of the screws 7. Extending centrally and longitudinally through the block 5 is a hole through which passes a draw bar 8. This draw bar has an enlarged extension 9, provided with a hole 10. Its other end is threaded and carries a hand wheel 11. We grip the piston in this device by placing it skirt end first over the member 9, and then passing a pin 12 through the wrist pin holes in the bosses 13. We then operate the hand wheel 11 to pull the draw bar 8 toward the right, whereby the bosses 13 are wedged into the V-shaped slot 6.

We mount a barrel saw 14 in the chuck 15 of the lathe and provide for the flow of lubricant by means of a pipe 16 having a nozzle 17.

With this set up, the lathe is started up, rotating the barrel saw, and the tool holder is fed to the left until the gate and riser are severed from the piston. This arrangement, while it is more rapid and more convenient than the band saw, does not eliminate one of its objections. As may be seen in Fig. 2, there still remain the small lands 1a.

A modified arrangement is shown in Fig. 3, which overcomes this objection. We have shown the device of Fig. 3 in connection with either a drill press or a vertical milling machine, although it could just as well be used on a lathe. In this case we utilize the barrel saw 14a, not only for removing the gate and riser but also for a rough machining of the piston wall. To this end we provide the barrel saw 14a with holes 18, to give free access for the cutting fluid and to permit egress of chips. The arrangement for holding and gripping the piston is the same as that described above, except that in this instance, we have provided means whereby while one piston is being machined, a finished piston may be removed and another one inserted for increased efficiency.

We have shown two piston holders indicated generally at 5a, mounted upon a carriage 19, which is adapted to be moved along rails 20. The indexing means comprise a bell crank lever 21, pivoted at 22, the far end of the lever 21 as seen in Fig. 3 adapted to enter the slots 23 and 24. With this arrangement it was only necessary to raise the lever 21 and slide the carriage 19 to the right until the lever 21 may be depressed, so that its other end enters the slot 24, where the carriage 19 will be properly indexed for the other piston holder.

Fig. 5 shows another modified set up in which the piston wall is machined, as was described in Fig. 3, and in which the head end of the piston is also faced. In this figure we have shown an air operated internal expanding chuck 27, having three spaced fingers 28 which serve to center the piston by the outward pressure of the fingers 28. This device also includes a locating stop 25 which is vertically adjustable as indicated generally at 26, to determine the height at which the piston is held. We have shown a spiral end mill 29 upon which is mounted by means of the screws 30, a barrel saw 14a, in all respects similar to the one described in connection with Fig. 3.

We have also shown mounted upon a track 31 of the machine, an adjustable stop 32, so that by proper adjustment of the support 25 and the stop 32, the thickness of the head end of the piston may be predetermined. As may be seen in Fig. 6, the head end of the piston is thus faced.

Fig. 7 shows a modification in which the piston wall, the skirt end of the piston and the counterbore at the skirt end of the piston, are machined in one operation. The piston holding device in this embodiment is similar to that described in connection with Fig. 5, except that the portion 27 thereof is retractible in the direction of the arrow. We have also shown a member 32 bearing against the head end of the piston which is adapted to move in the direction of the arrow during the machining operation, and thus to serve as a support to resist the efforts of the barrel saws. The saws, of which there are three, are mounted upon a chuck 33, which is rotatable in a journal 34, and which may be driven by means of a belt 35 and a pulley 36. The saw 14a is the same as that shown in Figs. 3 and 5. In addition to this, there is the barrel saw 14b, which is adapted to machine the portion indicated at 37 in Fig. 8, and a third barrel saw 14c which is adapted to machine the counterbore 38, shown in Fig. 8.

It will be noted that there is a clearance 39 annularly of the member 27 for chip egress.

In Fig. 9, we have shown a novel cutting tool which has a double purpose. Generally speaking, it has a cylindrical body 40, and a set of teeth 41, forming a barrel saw. The cylinder walls are provided with a plurality of slots indicated generally at 42. These slots comprise from the exterior, a routed portion 43 and a slot 44. There is also a large slot 45. On the inside there is a dove-tail slot 46, which tapers as best seen in Fig. 9, so that the inward extent of the cutting tool 47 may be varied in accordance with the vertical position of the cutting tool in the slot. The tool 47 is held in position by a machine screw 48 which passes through the slot 44. With this tool the gates and risers may be cut off, and the piston wall may at the same time be turned. The teeth 41 of the barrel saw serve to sever the gate and riser and the tools 47, which incidentally are substantially like the common lathe tool, serve to turn down the wall of the piston.

Although we have shown several modifications of our invention, and have shown it in connection with several kinds of machine tools, it is to be understood that any one of the modifications shown may be used on any of the ordinary machine tools having a rotating spindle and a tool holder which may be moved with respect thereto, so that our invention may be used in connection with a horizontal or vertical milling machine, or lathe or drill press.

We have used the term barrel saw for convenience of description, and by the term barrel saw, we mean generally a cylindrical tool having cutting teeth annularly disposed. Tools of this sort are known by many different names, and we have selected the term barrel saw, as being the most general.

Various modifications may be made without departing from the spirit of the invention, and we do not wish to be limited otherwise than as pointed out in the claims which are as follows.

Having thus described our invention, what we claim as new and desire to secure by Letters Patent, is:

1. A tool for rough machining of cylindrical castings, comprising in combination a barrel saw and a spiral end mill, said end mill being located within the barrel saw at a point at which it will be in position to machine one end of the casting when the barrel saw is approximately at the end of its cutting stroke.

2. A tool for rough machining of cylindrical castings, comprising in combination three barrel saws, one of a length slightly greater than the length of the casting to be machined, and two shorter ones, one of which is positioned to counterbore one end of the piston and the other of which is positioned to face said end of the casting.

3. A tool for machining cylindrical castings, comprising a barrel saw, a plurality of slots in the body of said saw, said slots being disposed parallel to the axis of said saw, at least one of the faces of said slots being out of parallelism with the axis of said saw, and cutting tools mounted in said slots with their cutting edges internally disposed, whereby the depth of cut of said cutting tools may be varied by varying the position of said tools in said slots.

4. The method of machining cylindrical castings having gates and risers remaining from the casting operation, which comprises removing said gates and risers, and at the same time reducing the diameter of the castings by means of a barrel saw.

5. A method for surface treating of a cylindrical casting having gates and risers thereon resulting from the casting operation, which comprises passing lengthwise over the casting a barrel saw having its cutting edges of substantially the circumference of the casting, and while passing the saw over the casting, effecting relative rotation between the saw and casting.

6. A tool for rough machining of cylindrical castings having appendages thereon remaining from the casting operation, comprising a barrel saw having an axial length at least equal to that of the casting to be machined, a diameter of cutting edge of approximately the finished diameter of the casting and provided with a plurality of holes to permit egress of chips and access for lubricant and a thickness which throughout said length is not greater than that of the cutting edge.

ARTHUR E. SCHNELL.
MELBOURNE A. BECKMANN.